United States Patent [19]

Mueller et al.

[11] Patent Number: 5,222,211
[45] Date of Patent: Jun. 22, 1993

[54] FORM GENERATING METHOD AND APPARATUS

[75] Inventors: Gerhard Mueller, Berlin; Hugo Pickardt, Paderborn; Anna-Kristin Proefrock, Berlin, all of Fed. Rep. of Germany

[73] Assignee: Siemens Nixdorf Informationssysteme AG, Paderborn, Fed. Rep. of Germany

[21] Appl. No.: 884,039

[22] Filed: May 14, 1992

Related U.S. Application Data

[63] Continuation of Ser. No. 6,686, Jan. 23, 1987, abandoned.

[30] Foreign Application Priority Data

Jan. 24, 1986 [DE] Fed. Rep. of Germany ....... 3602143

[51] Int. Cl.⁵ ............................................. G06F 15/40
[52] U.S. Cl. .................................... 395/161; 395/155; 340/706; 340/739
[58] Field of Search ................. 400/68, 76; 340/706, 340/712, 734, 703, 747, 750; 395/155, 161; 364/401, 402, 200 MS File, 900 MS File

[56] References Cited

U.S. PATENT DOCUMENTS

| | | | |
|---|---|---|---|
| 4,187,520 | 2/1980 | Beduchaud et al. | 358/257 |
| 4,403,301 | 9/1983 | Fessel | 364/900 |
| 4,542,378 | 9/1985 | Suganuma et al. | 340/734 |
| 4,566,127 | 1/1986 | Sekiya et al. | 340/734 |
| 4,598,284 | 7/1986 | Ikegami et al. | 340/750 |
| 4,604,696 | 8/1986 | Suganuma et al. | 364/401 |
| 4,646,250 | 2/1987 | Childress | 364/518 |
| 4,658,366 | 4/1987 | Posh | 364/523 |
| 4,674,040 | 6/1987 | Barker et al. | 364/300 |
| 4,677,551 | 6/1987 | Suganuma | 364/401 |
| 4,677,585 | 6/1987 | Ikegami et al. | 364/900 |
| 4,688,167 | 8/1987 | Agarwal | 364/200 |
| 4,712,929 | 12/1987 | Kitaoka | 400/76 |
| 4,763,356 | 8/1988 | Day, Jr. et al. | 379/368 |
| 4,826,333 | 5/1989 | Tanaka | 400/76 |
| 4,832,513 | 5/1989 | Ikekita | 400/76 |
| 4,860,218 | 8/1989 | Sleator | 364/518 |
| 4,864,516 | 9/1989 | Gaither et al. | 364/518 |

FOREIGN PATENT DOCUMENTS 0158766 10/1985 European Pat. Off. ............ 340/734

Primary Examiner—Phu K. Nguyen
Attorney, Agent, or Firm—Varnum, Riddering, Schmidt & Howlett

[57] ABSTRACT

A process of controlling the course of a program in form processing by data processing systems for data contents of a form (80, 81, 82) built of fields to be processed. The pictorial illustration (display of the form (80, 81, 82), the reading and fading in of the data relevant for this form, the manipulation of these data by the user and the processing of these data arranged by the user by a firmly assigned form processing program to the form after selection of a form specification. The form processing program is composed here, under predetermination of the actual form specification, according to the available fields, gradually of individual programs which are typical for the field.

12 Claims, 2 Drawing Sheets

FORM GENERATING METHOD AND APPARATUS

This is a continuation of application Ser. No. 07/006,686 filed Jan. 23, 1987, now abandoned.

BACKGROUND OF THE INVENTION

1. Field of the Invention

The invention relates to a process and an arrangement for controlling the course of a program in processing forms in data processing systems for data contents of a form (blank) consisting of fields to be processed in which the pictorial presentation of the form, the reading and the feeding in of the data relevant for this form, the manipulation of this data by the user and the processing of this data by a form processing program strictly assigned to this form and arranged according to the choice of the user among several form specifications.

2. Description of Related Art

Data processing systems for the field of business and administration are used mostly with two principles of application. They serve, on the one hand, for solving business object tasks, as for example writing invoices, registering bills of delivery, updating accounts of objects, net requirement accounts, wage and salary account settlements. Such business object tasks are prepared without taking into consideration the actual office organization whereby data are also processed. On the other hand, a data processing system can be equally applied as an office communication system in order to increase the efficacy of purely administrative tasks. In this process, mainly forms are processed the contents of which are not being further processed by the data processing system. Furthermore, parts of office organization, as for example calendars, files, card files, addressed, etc., are additionally gathered. Mainly data displays are provided by this process.

Heretofore, a combination of these two processes in the application of a data processing system required the creation of a combined working and displaying program. When a change is to be introduced into the framework of one of the principles of application, then, for example, one of the forms must be changed and a complete revision of the combined program is necessary, since the individual parts of the program for the data processing and display of data are not independent but are realized as a user program, with subprograms contained within them.

SUMMARY OF INVENTION

Accordingly, it is the task of the invention to indicate a possibility for integration of the above explained two principles of application of a data processing system that is not based on measures of programming techniques, so that the prior mutual dependence of the data processing and data displaying are avoided in the program.

The invention solves this task for a process of the initially mentioned type in such a way that to each stored form specification data words are additionally assigned as field specifications of the individual fields of the actual form (blank), with the data words read and sequentially evaluated in connection with the presentation (display) of the form so as to address an individual program for each field in this evaluation of a suitable sequence executing a data processing that is typical for the field and that the thus addressed individual programs are subsequently worked off.

In this process, the control of the display of the form can be completely separated from the control of the data processing so that the formal structure of a screen form can be freely created without the need for changes in the programming technique of the data processing. Since the sequence of the call-in of the fields, forming the actual form, determines the sequence of the individual programs within the frame work of the specifications of the form with the help of which the information contained in the prospective field can be processed, the forming of a new form processing program is extremely simple, and the adding of a further form field, including its logic of processing, into an existing program is done basically by inclusion of this form field into the specification for the form and with the creation of the data words that describe them.

The term of a data processing typical for the field with an individual program in the sense of the invention shall be considered the assignment of certain processing programs to certain field types of a form (blank). In form processing there are forms and form fields of different types, according to which a selection can take place. Different types of forms are, for example, bills of delivery, invoices, accounts of salaries, etc. Different types of field are defined so that they serve always for the same purpose. That is, they are foreseen for displaying identical types of information. Fields are concerned, e.g., in which an address, a number of a client, a data, a quantity, a designation, or a price are indicated.

The individual programs for a certain type of field enable a data processing that is special for this type of field, considering the heretofore necessary and always recurring identical operations. Such fields which indicate basically successive numbers require a simple program of addition, while, for example data fields, indicating a calendar date, are submitted to a data processing that depends on the prevailing data of the calendar.

As now the form specification is not only used for the purpose of indicating the type of a selected form only, but equally for specifying the composition of the form processing program from individual programs typical to the field, this enables them to process the data of the form contents specifically according to the form and still not dependent on the remaining user's program of a data processing system. An integration of the data processing and of the data displaying is thus realized in which the data display and the therewith connected data processing can be varied at will without the need for a circumstantial revision of an entire program of application.

The gradual composition of the program of the processing from individual programs typical for the field can take place according to different directive outlines. It is thus possible to arrange the composition of the form so that in the selection of a specification of the form being formed, the user of the data processing system will be allowed to select fields of the displayed form the user intends to work on (to process). This means an at will selectable sequence of working off a form processing program, being composed from individual programs while it is being worked off by the user. However, it is also possible to use the identification of the form specification in order to control the sequence of the call-in of the individual programs. In any case, the result of the identification of the form specification is used for an access to stored data which are assigned to the actual identified field and shall be processed.

BRIEF DESCRIPTION OF THE DRAWINGS

Examples of the execution of the invention are described in the following according to the figures. They show in.

DETAILED DESCRIPTION

Figure 1:
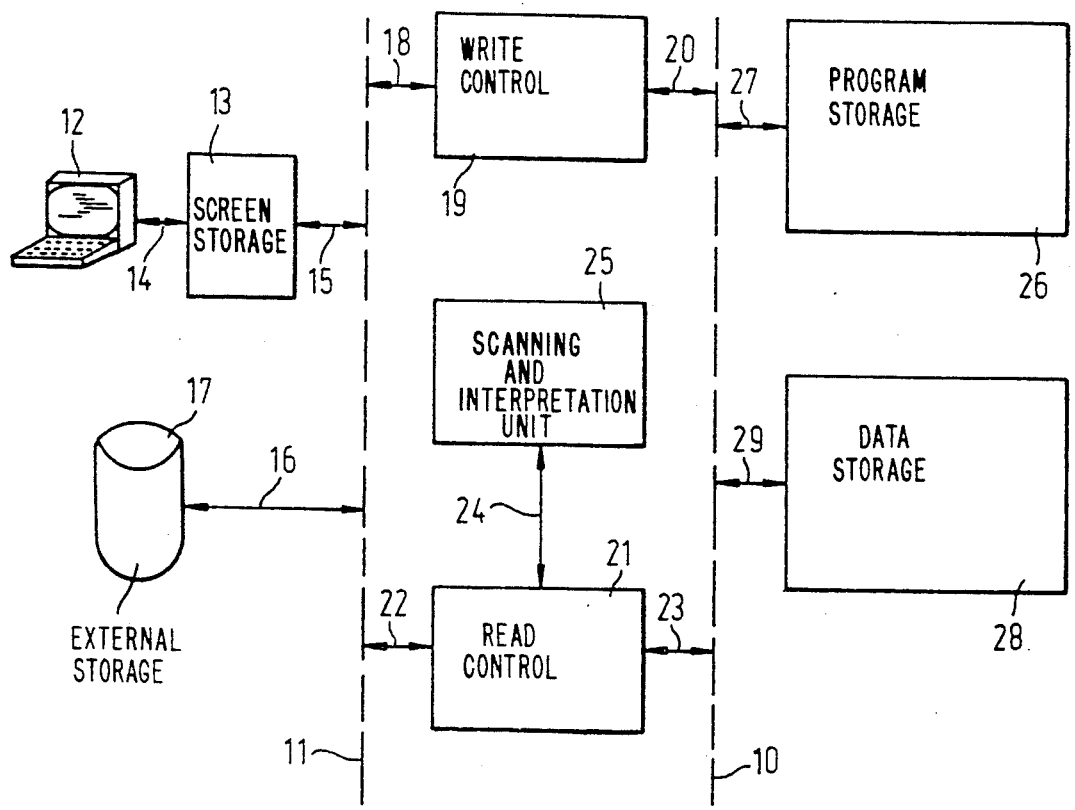
FIG. 1, the most important components of a data processing system for data processing and data display.

The data processing system shown in FIG. 1 enables a communication between its individual functional units by means of an internal bus 17 and an external bus 11 which are indicated in FIG. 1 by dashed lines. A data terminal using a screen 12 is connected to the external bus 11 by a screen storage 13. For this purpose, signal paths 14 and 15 are provided. Furthermore, an external storage 17 is connected to the external bus 11 by a signal path 16. The storage 17 can be, for example, a disc storage or similar.

A signal path 18 leads from the external bus 11 to a write control unit 19 which is attached by a further signal path 20 to the internal bus 10. A read control unit 21 is further provided and is connected by a signal path 23 to the internal bus 10 and by a signal path 22 to the external bus 11. The read control unit 21 is further connected by a signal path 245 with a scanning and interpretation unit 25.

Two internal storages 26 and 28 are foreseen. The internal storage 26 works as a program storage and is connected by a signal path 27 to the internal bus 10, while the internal storage 28 works as a data storage and is connected by a signal path 29 with the internal bus 10.

The steps are now generally described in the following according to which the course of the program can be controlled so that the information contained in the individual fields of a form can also be processed within the data processing system, i.e., can be taken from a form, changed and then submitted to data processing steps.

Initially, a data word is fed into the screen storage 13 by the keyboard of the working place for the screen 12 by means of the signal path 14. The data word is a form specification by which the selection of a certain desired form from an available set of form shall take place. The contents of this data word are then transmitted from the screen storage 13 by signal paths 15 and 22 to the read control circuit 21 by which the scanning and interpretation circuit 25 is actuated by means of the signal path 24. The content of the data word is scanned and interpreted so that the specification of the desired form can be determined by this process. This specification is transmitted by means of the read control circuit 21 and signal paths 22 and 16 to the external storage 17 in which the set of forms, available for this data processing system, is stored. The desired form can then be addressed in the external storage 17, whereafter from the external storage 17, information about the structure and content of this addressed form, are written by means of data words via signal paths 16 and 15 under control of the write control 19 into the screen storage 13. Thus, the desired form is then displayed in the shape of a form mask on the screen data terminal 12 by the signal path 14.

This process is associate with the transmission of data words from the screen storage 13 into the data storage 28 under control by the write control circuit 19. These data words characterize field specifications of individual fields of the form displayed on the screen data terminal 12. This transmission of data words thus takes place via signal paths 15, 18, 20, and 29 into the data storage 28. When the data storage 28 contains these data words of the field specifications, it can transmit them under control of the read control circuit 21 through signal paths 29, 23, and 24 to the scanning and interpretation circuit 25 which evaluates sequentially the data words in order to determine the required individual program for each field of the form displayed on the screen data terminal so that the information displayed in this field is made accessible and can be submitted to data processing. The individual programs are addressed by means of the read control circuit 21 into the external storage 17 by signal paths 22 and 16 and written by the signal paths 23 and 27 into the program storage 26 so that a sequence of individual programs can then be worked off as a normal program is created there stepwise.

This program sequence depends on the partition of the form actually displayed on the screen data terminal 12 into individual form fields and on the sequence of the activation of the individual form fields which are determined by the user on the working place 12 of the screen or by the form specification.

Within the framework of working off the program logic composed in the program storage 26 in this manner, it is possible to execute, as in every normal data processing, an inquiry to the user, a reaction of the user, and an internal data processing. After this has been performed for each actual field of the form work displayed on the screen data terminal 12, such data processing for the actual form can be repeated at will, and the data words for the actual form field can be transmitted from the field specification to the scanning and interpretation circuit 25, and depending on the evaluating activity of these, a sequence of field related program steps can be transmitted from the external storage 17 into the internal program storage 26.

In case that a new form is displayed on the work place 12 of the screen, the above-described process is repeated starting with the entry of a data word for the selection of the form by the keyboard in the screen storage 13.

Figure 2:
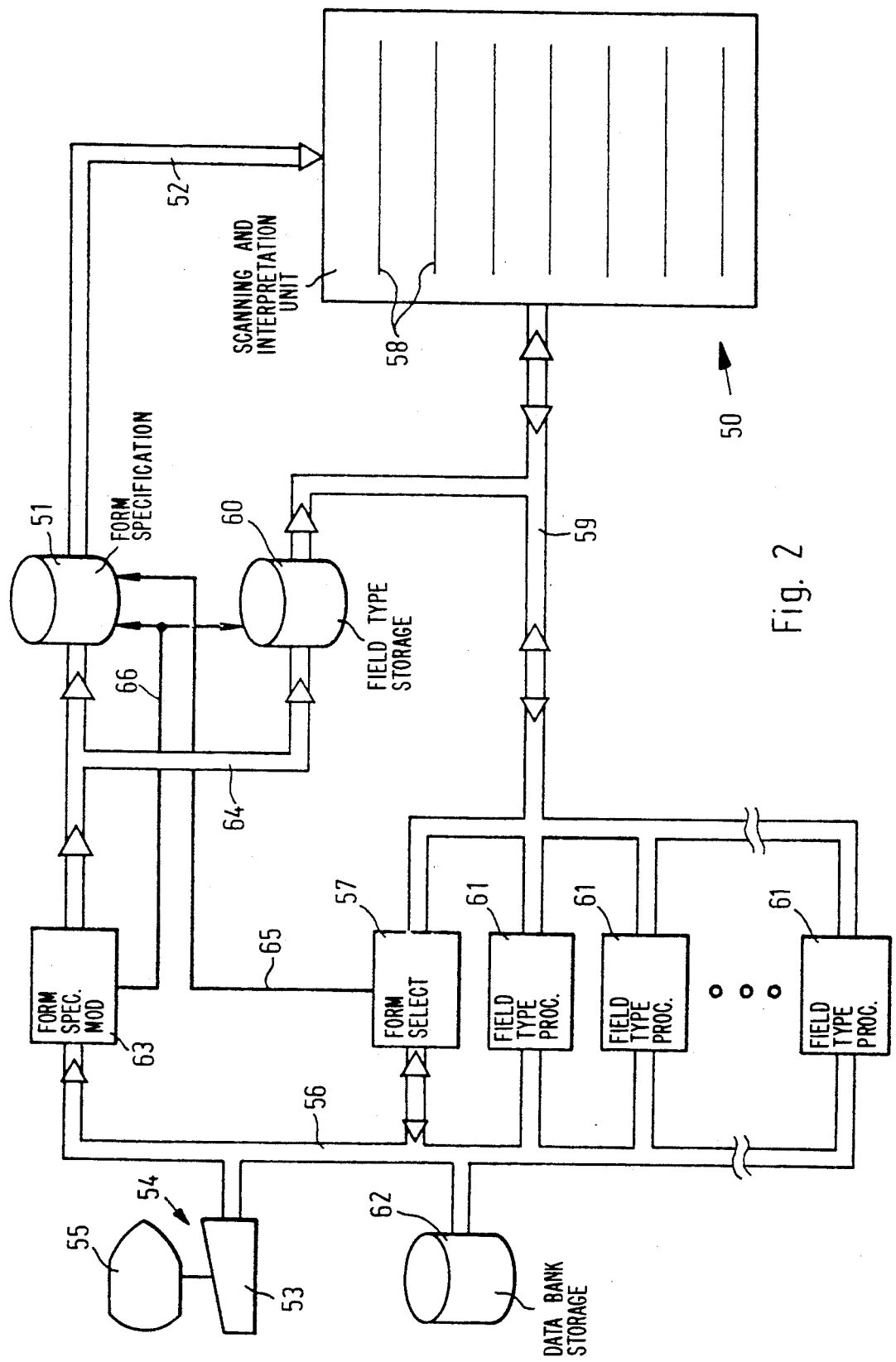
FIG. 2, a second data processing system with special components for form processing.

FIG. 2 shows the principal structure of a further data processing system for a further explanation of controlling the processing of a form. A scanning and interpretation unit 50 is formed in it as a programmable device control into which the data of a form to be processed are feedable. The data of all processible forms—called form data in the sequel—are stored in a form storage 51 as form set in the form of form specifications and arrive therefrom under control of a not illustrated data processing and control unit by a first data path 52 into the scanning and interpretation unit 50. The selection of the form to e processed is done by the user by entering a corresponding control order by the keyboard 53 of its screen data terminal 54 over an external bus 56 into a form selection module 57 which again forms the storage address of the selected form specification and gives this together with a reading order over a first control path 65 to the form storage 51.

Each form specification contains coordinates of the place of the form on the display 55 for the screen data terminal 54, as well as a sequential set of definitions of the fields forming the form. The field definitions are stored in the scanning and interpretation unit 50 so that each field has assigned its own "slot" 58. In FIG. 2, these "slots" are symbolically illustrated. Each field definition contains a name of the field and coordinates of the actual field within the form.

The scanning and interpretation unit 50 is connected by an internal bus 59 with a field type storage 60. This contains, among others, pointer to the field type processing modules 61 assigned to the individual field types. The scanning and interpretation unit 50 is as well connected by the internal bus 59 to the latter 61. All field type processing modules 61 are further interconnected with the external bus 56 by which a data bank storage 62 and the screen data terminal 54 are accessible. To allow the user to create new or to change existing forms, the data terminal 54 is connected via an external bus 56 to a form specification module 63, which may access via a second data path 64 to the form storage 51 and the field type storage 60. The addressing and control of the storages 51 and 60 by the form specification module is carried out via a second control path 66.

The mode of operation of the circuit corresponding to FIG. 2 will be described referring to FIG. 3 in the sequel. Here, as an example of a screen form, parts of a delivery note are shown. The form may fill a whole screen 80, or be composed out of other, arbitrary many screen pages 81, 82. Preferably, the arrangement of the screen form or the distribution of the fields 83 respectively, corresponds to that of paper forms, that may be printed by a printer as the result of the working step.

As already described, the user starts the processing by entering on a keyboard a control command, here the command "delivery note," into the form selection module 57. This is then presented as a screen mask on the display 55, i.e., the field identifiers "Receiver," "Customer No.," Date," etc. are shown on the screen, while the corresponding fields 83 are filled either by the user using the keyboard 53 or during the processing of the form by the field type processing module 61. The data necessary for the presentation on the screen mask are routed from the scanning and interpretation unit 5 via the internal bus 59, the form selection module 57 as well as the external bus 56 to the display 55. If necessary, the user performs a processing selection using a further control command (e.g., "Create," "Change," "Display"). The form selection module 57 initiates in this example the loading of the form specification of the delivery note form from the form storage 51 into the scanning and interpretation unit 50 in such a way that by each field 83 a "slot" 58 is occupied. At the beginning of the forms processing the contents of the first slot 58 is made available for processing by the scanning and interpretation unit 50. Thereby, the field type of the field is determined out of the field name directory stored in a field type storage 60. To each field type a field processing module is assigned, as already mentioned.

Thus, fields "voucher number" and "customer number" are, for example, so called identification fields. The field "data" is a field of date type. The field "article number" is to be designated as an identification field with an embedded identity since the article number has assigned further information, such as designation of article and price. The fields "quantity" and "price" are value fields, and the fields "receiver" and "designation" are text fields. Further, field types are conceivable. Many field types and thus field type processing modules 61 are realized, just as there are data types with respective processing routines available in this system.

Thus, for example, the calendar date type is needed since a calendar date is submitted to a special processing. The entered date must be also tested from the point of view as to whether this date exists in the calendar. Algebraic computations must be executable for the value fields.

After having determined the field type and having thereby assigned the respective field type processing module 61 to the latter, the field definition data will be transmitted. The data which are needed for the field for processing will be called off by the field type processing module 61 from the data bank 62 and the processing results will there be put down. The information which must be indicated in the respective field 83 of the screen form will be put out on the display 55.

As soon as the field type processing module 61 has finished its work, it reports this over the internal bus 59 to the scanning and interpretation unit 50 that makes then available the content of the next slot 58. This will be worked off in the above-described manner. These operations are repeated until all slots 58 are worked off. It is not necessary that the screen form is processed in the sequence of the fields 83. Since, as described, the field definition among others contain the coordinates of the actual field 83 within the form, each field can be arranged at any place on the form and also beyond the borders of the screen. The sequence of the field processing, on the other hand, is determined only by the sequence of the field definition sets in the scanning and interpretation unit 50.

Figure 3:
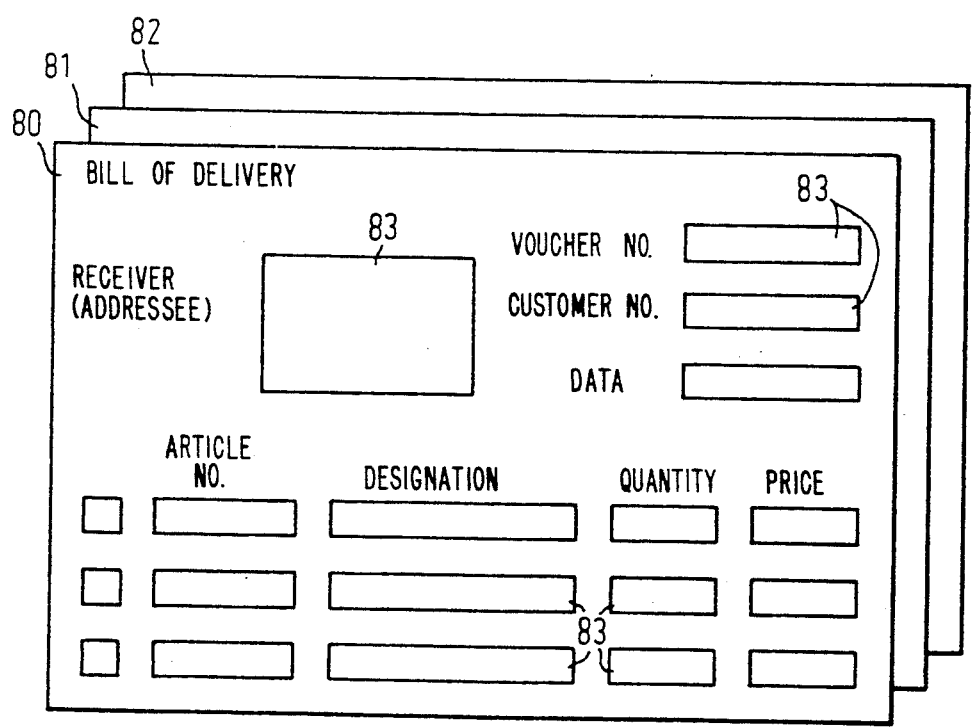
FIG. 3, a schematic illustration of one of several pages of forms.

For the example shown in FIG. 3, the field "voucher number" first and then the field "date" and then the field "customer number" can be processed, although the sequence shown in FIG. 3 is a different one on the screen.

It will be apparent to those skilled in the pertinent art that modifications and variations of the above-described illustrative embodiment of the invention can be effected without departing from the spirit and scope of the novel concepts of the invention.

The embodiments of the invention in which an exclusive property or privilege is claimed are defined as follows:

1. A form generating method in a data processing system comprising a user interface including a display unit for displaying pictorial representations of forms, the method comprising the steps of:
   storing in a form specification table, form specification data identifying a plurality of forms and data identifying a plurality of individual fields within each of the forms;
   displaying on the display unit a representation of a selected form;
   executing an evaluation program which identifies fields of the selected form from data in the form specification table and for each identified field selects a predefined field execution program individually associated with the identified field; and
   executing the selected field execution program to compute data for insertion in the selected field using at least one of user input data received from the user interface and system data previously computed in the data processing system.

2. The method in accordance with claim 1 wherein the specification table includes field definition data and wherein the step of executing an evaluation program comprises an evaluation of the field definition data in the table and wherein the predefined field execution program is selected on the basis of the evaluation.

3. The method in accordance with claim 1 wherein the steps of executing a selected field execution program is performed sequentially for each field of the selected form and the sequence is determined by the data in the specification table.

4. The method in accordance with claim 2 wherein the field definition data comprises field type data and wherein the predefined field execution program is selected on the basis of the field type data.

5. The method in accordance with claim 4 wherein the identification results are used to access stored field associated data.

6. The method in accordance with claim 1 wherein field definition data stored in the form specification table is compared with a name index stored in a field type storage area and the field definition data for each field is transferred to a field type processing module assigned to a particular field type in which data processing typical for the particular field is executed.

7. The method in accordance with claim 6 wherein the field definition data is used in displaying data computed by the selected field execution program on the display unit.

8. The form generating method in accordance with claim 1 and comprising the step of displaying a representation of another selected form having at least one field not included in a previously generated form and at least one field corresponding to a field of the previously generated form and wherein said steps of executing and displaying include the step of selecting and executing a field execution program executed in connection with the previously generated form.

9. A form processing system comprising:
a data processor including a memory for storing data;
a user interface, including a display unit, connected to said data processor;
a specification table in said memory for storing data defining specifications for a plurality of individual forms and data defining specification for fields within each of said forms, including field type data, at least one of said fields in each of at least two different ones of said forms being of the same field type;
said data processor comprising a plurality of individual program modules, each associated with one of said field types for performing data processing functions unique to said one of said field types;
said data processor further comprising an interface program module responsive to an input signal from said interface identifying one of said specified forms to read said table and to evaluate fields of said identified form and to initiate for each evaluated field execution of an individual program module associated with the field type of said evaluated field.

10. A form processing system comprising:
a data processor including a memory for storing data;
a user interface connected to said data processor;
a specification table in said memory storing data defining a plurality of individual forms and data defining field types assigned to fields within said forms;
said data processor comprising a plurality of individual program modules, each associated with one of said field types for performing data processing functions unique to said one of said field types;
said data processor further comprising an interface program module responsive to an input signal from said interface identifying one of said forms defined in said table to read said table and to evaluate fields of said identified form and to initiate for each evaluated field execution of one of said individual program modules associated with the field type of said each evaluated field.

11. The system in accordance with claim 10 wherein said one of said individual program modules computes data to be inserted in an associated field on the basis of at least one of data received from said user interface and data previously generated and stored in said form processing system.

12. The system in accordance with claim 11 wherein said user interface comprises a display unit and wherein said interface module is responsive to a further input signal from said user interface identifying another of said specified forms having at least one field of the same type and at least one field of a different type from a previously processed form, to display on said display unit said other form and to initiate execution of at least one of said individual program modules executed in association with said previously processed form.

* * * * *